May 18, 1965 A. B. CRAWFORD 3,184,743

ANTENNA STRUCTURES FOR COMMUNICATION SATELLITES

Filed March 7, 1961 2 Sheets-Sheet 1

INVENTOR
A. B. CRAWFORD
BY Roy M. Porter, Jr.
ATTORNEY

ANTENNA STRUCTURES FOR COMMUNICATION SATELLITES

Filed March 7, 1961 2 Sheets-Sheet 2

INVENTOR
A. B. CRAWFORD
BY Roy M. Porter Jr.
ATTORNEY 3,184,743

ANTENNA STRUCTURES FOR COMMUNICATION SATELLITES

Arthur B. Crawford, Fair Haven, N.J., assignor to Bell Telephone Laboratories, Incorporated, New York, N.Y., a corporation of New York Filed Mar. 7, 1961, Ser. No. 94,081
4 Claims. (Cl. 343—100)

This invention relates to antenna systems and more particularly to antennas arranged for use in and with satellite vehicles to adapt such vehicles for use as repeater stations in satellite communication systems.

In one type of communication system utilizing earth satellites as repeater stations that have been proposed, the satellite vehicle serves as the relay station of a line-of-sight communication system and is equipped with transmitting and receiving equipment by means of which a signal from a first earth station may be detected, increased in level, and radiated toward another earth station of the system. It is obvious that in a system of this kind, the repeater station must be furnished with antennas which are either as isotropic in nature as possible or which are oriented with respect to the terminal stations to promote transmission efficiency.

It is thus seen that there are two basic problems involving antenna systems for such applications. The first of these involves provisions for orienting either the vehicle as a whole or the antennas with respect to the vehicle so that the radiation patterns of the antennas are directed appropriately with respect to the directions in which communication is to be undertaken. The second problem results from the fact that the vehicle itself must be designed in such a way that it may be launched as a compact unit from a rocket carrier and made ready for operation while in orbit.

In the copending application of C. C. Cutler, Serial No. 74,183, filed December 6, 1960, a satellite antenna is described which substantially meets these requirements by forming the antenna as an integral part of an essentially spherical satellite vehicle. Basically, the system there described comprises one or more peripheral conical horn antennas each of which is contained within and intersects the envelope of the spherical vehicle in a slot-like opening. This arrangement provides a radiation pattern which is appropriate to the kind of orientation system which may be employed in a spherical satellite vehicle and which permits radiation of electromagnetic wave energy in a form calculated to suffer the least degradation in the transmission path.

An additional factor is involved in the design of antennas for use in satellite communications and relates to the fact that as the satellite travels in orbit, it will be seen by receiving stations from many angles. Thus, if the satellite antenna is designed for linearly polarized waves, signals therefrom will reach the receiver location with variable polarization. In some cases, also, the ionosphere may produce variable rotation of the plane of polarization of radio waves passing therethrough. These factors would suggest the use of circularly polarized waves as an appropriate means of transmission between the satellite vehicle and the terminal stations. Such waves, however, are not ordinarily produced by a biconical horn antenna.

It is, therefore, an object of the present invention to introduce circular polarization to the radiation of a biconical satellite horn antenna by improved and simplified apparatus.

In accordance with the invention this object is accomplished by surrounding the circumferential radiating aperture of a biconical antenna with a large plurality of radially extending square waveguides, each of which contains a ninety degree differential phase shifter inclined at forty-five degrees to the plane of the radiating aperture. The biconical antenna thus becomes the feed of the multiguide radiator and each of the multiguides intercepts a fraction of the power in the linearly polarized wave in the biconical antenna and converts it into circular polarization. After leaving the satellite, these parts combine to form the total toroidal pattern of circular polarization. By reciprocity, a circularly polarized wave incident on the satellite is converted to a linearly polarized wave in the biconical horn.

The above and other objects and features of the invention will be considered in the following specification taken in connection with the drawing in which.

Figure 1:
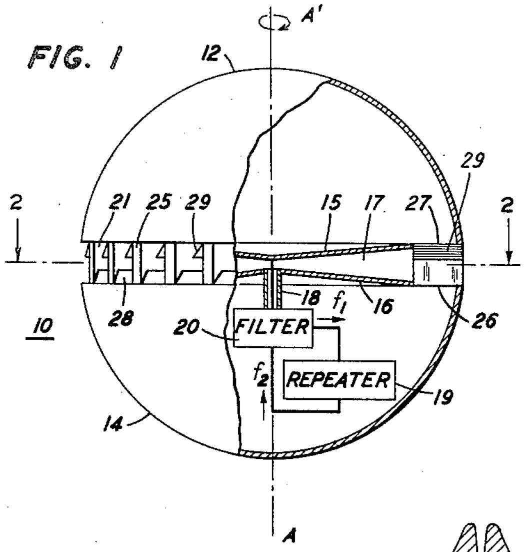
FIG. 1 is a plan view of a spherical satellite vehicle equipped with an antenna according to the invention, shown partly in section to facilitate understanding of the antenna structure.

As shown in FIG. 1, an essentially spherical body 10 is taken as illustrative of a typical satellite vehicle. Ordinarily, such a body is made of light gauge, lightweight metal or a metal-plastic sandwich material and serves as the strength member which supports all of the remaining elements of the radio repeater station. Such a spherical vehicle may be considered as comprising hemispherical body portions 12 and 14, supported and joined as will be described hereinafter. The mass of the vehicle is concentrated and distributed more or less symmetrically so that the greatest moment of inertia of the vehicle will be about the axis passing through the center and normal to the diametrical plane 2—2. It is well known that a vehicle or body launched spinning about the axis of the greatest moment of inertia and with that axis normal to the plane of the orbit in which the vehicle is to travel will remain oriented in this manner so long as the spin of the vehicle about the defined axis is maintained. In the arrangement shown in FIG. 1, it is assumed that the mass of the vehicle is so concentrated and that the satellite vehicle is launched spinning about the axis A–A' normal to the plane of the orbit in which the vehicle is to travel.

The form of orientation just considered is relatively crude in nature and requires that the antenna system employed in the vehicle for use as an active repeater station either provides nearly isotropic radiation patterns or radiation patterns which are symmetrical with respect to the rotational axis.

As shown in FIG. 1, the feed of such an antenna is formed by opposing conical conductive surfaces 15 and 16, having their apexes near the respective centers of hemispheres 12 and 14 and forming a radiating aperture in the form of a circumferential slot 17 between the extended edges of surfaces 15 and 16. Such a radiating aperture is excited by a conventional coaxial connection 18 in which the inner conductor is connected to the cone apex of conical surface 15 and the outer conductor is connected to conical surface 16. Co-ax 18 will excite a mode of electromagnetic wave energy between conical surfaces 15 and 16 that has an electric field extended transversely between the surfaces and a magnetic field in the form of ever enlarging concentric circles. The spacing between surfaces 15 and 16 is suitably small enough near the coaxial connection that modes other than this desired mode will not be excited.

Co-ax 18 connects the antenna to the input and output of repeater 19 through a suitable channel branching filter 20. As illustrated, a single antenna is used for receiving and transmitting at respective frequencies $f_1$ and $f_2$. The frequency separation between $f_1$ and $f_2$ and branching filter 20 serves to prevent feedback between output and input of repeater 19 in accordance with conventional radio repeater practice. However, it should be understood that the antenna in accordance with the invention is not limited to this repeater arrangement.

Figure 2:
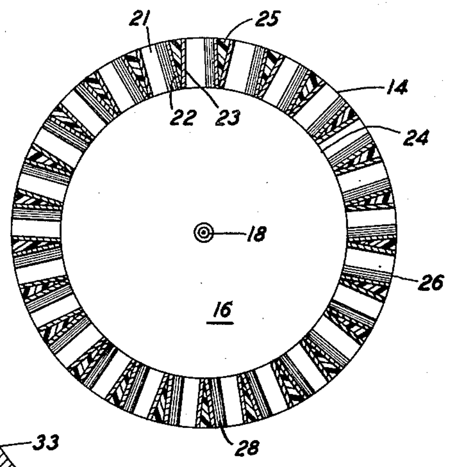
FIG. 2 is a cross-sectional view, taken as indicated through the satellite antenna of FIG. 1.

As noted above, it is necessary to radiate the electromagnetic wave energy from circumferential slot 17 with circular polarization. The radiating element of the antenna, in accordance with the invention, comprises a large plurality of conductively bounded waveguides 21 of square cross-section disposed around the periphery of slot 17. As may be seen in FIG. 2, guides 21 are each positioned with the longitudinal axis thereof aligned with a radius of biconical structure in plane 2—2 so that side walls such as 22 and 23 of each guide are contiguous at the circumference 24 of surfaces 15 and 16 but are spaced apart at the circumference of hemispheres 12 and 14. The wedge shaped regions left between adjacent side walls 22 and 23 of adjacent guides are preferably filled with rigid material 25. This material 25 forms part of the structure members supporting hemispheres 12 and 14 and the other components of the vehicle in their relative position. In accordance with the one form of construction, conical surfaces 15 and 16 are each provided with parallel plate extensions 26 and 27, respectively. Extensions 26 and 27 form between them an outer peripheral portion of the radiating region between surfaces 15 and 16 which is then divided into the square guides 21 by a large plurality of conductive partitions which form the side walls 22 and 23 of the guides. Guides 21 have suitable dimensions so that in the presence of the loading, to be described hereinafter, they are capable of supporting wave energy in two orthogonal modes of propagation.

Figures 7, 8, 9:
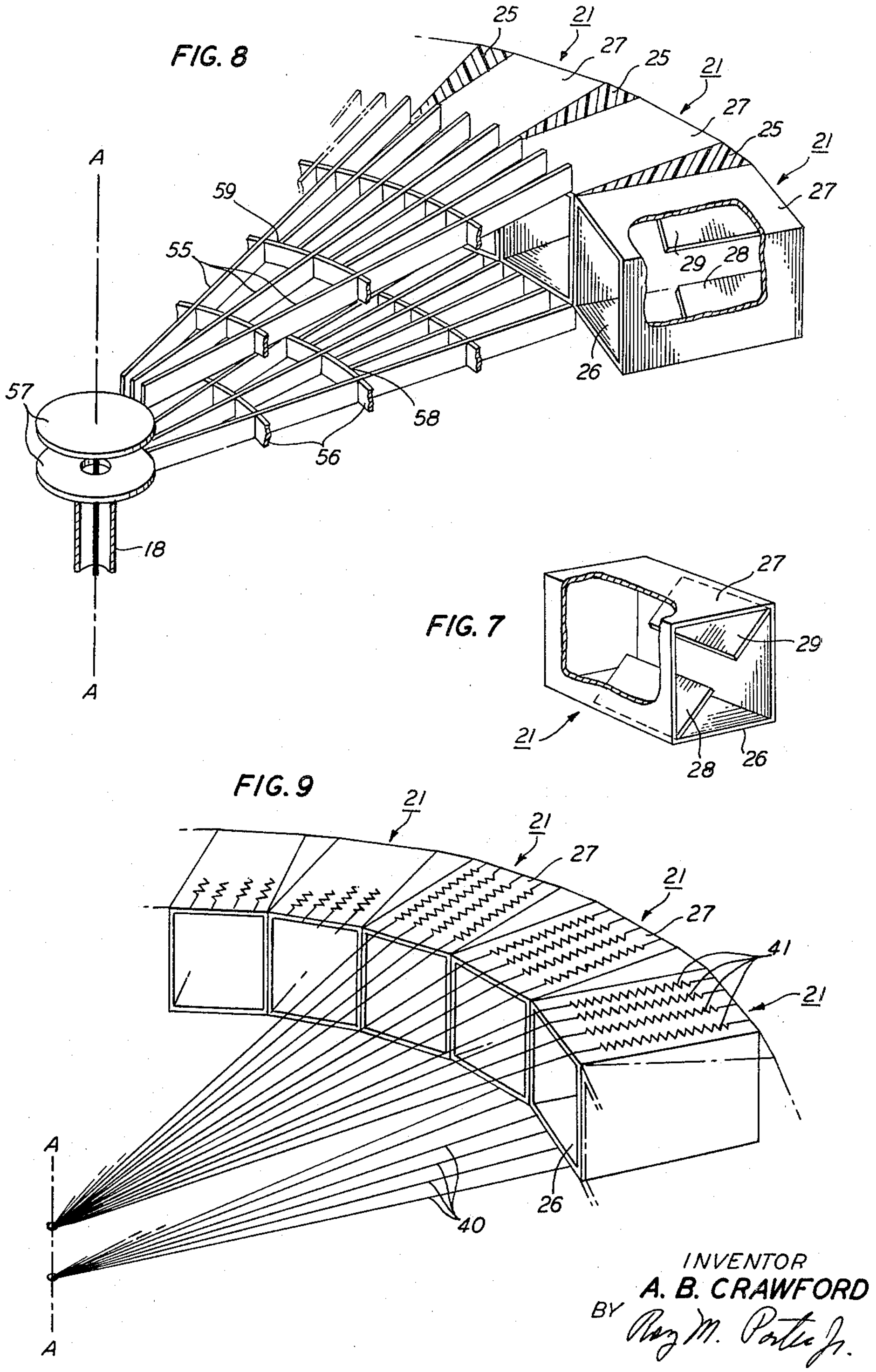
FIG. 7 is a plan view, partly cut away, of a waveguide section containing the phase shifters.
FIGS. 8 and 9 are views illustrating alternative constructions of the biconical horn portion as associated with the waveguide sections.

Included in each of guides 21 is suitable means for introducing a differential phase shift of an odd multiple of ninety degrees to wave energy polarized in a plane at forty-five degrees to the plane of surfaces 26 and 27 with reference to wave energy at right angles thereto. As illustrated in FIGS. 1 and 7, this means comprises a pair of opposing conductive fins or vanes 28 and 29, located diagonally in and extending a portion of the way across each of square guides 21. It should be understood, however, that other forms of differential phase shifting elements such as dielectric vanes, reactive probes, etc. can be used. Furthermore, vanes of different sizes and compositions may be included in the plane of each of the two diagonals of guides 21 so long as the desired differential of phase shift is maintained. In accordance with a feature of the invention the length and cross-sectional dimensions of each guide 21 and the loading produced by fins 28 and 29 are proportioned with respect to each other so that a ninety degree differential phase shift or an odd multiple thereof is produced at both the receiving frequency $f_1$ and the transmitting frequency $f_2$. This may be readily done in accordance with standard design considerations.

Figures 3, 4, 5:
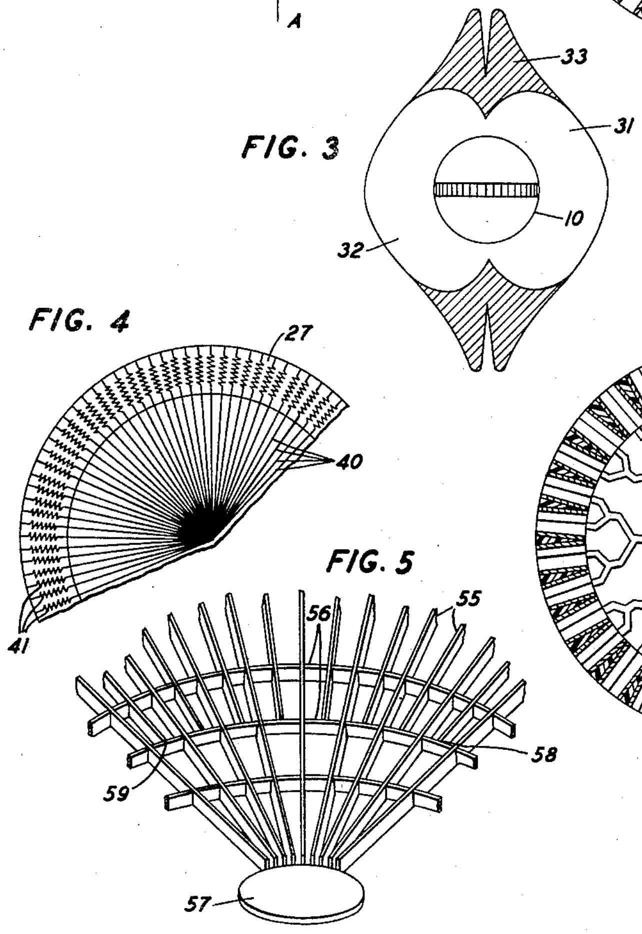
FIG. 3 is a schematic diagram illustrating the radiation patterns to be expected from the antenna system of FIG. 1.
FIGS. 4 and 5 are views illustrating alternative constructions of the biconical horn portion of the antenna of FIG. 1.

In operation, the circular wave front leaving slot 17 is intercepted by all of guides 21 so that a portion of the wave excites each guide in a mode having an electric field extending between parallel plates 26 and 27. The field within each guide may then be resolved into two components, one lying in the plane of fins 28 and 29 and the other normal thereto. Upon leaving guides 21 one component has been delayed ninety degrees with respect to the other and the energy within each guide thus has a circular polarization. Since the part of the radiating energy in each guide is in phase with the radiating energy of every other guide, the parts combine to form a total toroidal radiation pattern of circular polarization. A typical pattern is shown in FIG. 3 which comprises two strong major lobes 31 and 32 in addition to frequency selective minor lobes in the shaded area 33. The pattern is almost isotropic except for minor holes at the poles and is symmetrical about the rotation axis. It will be recognized that such an antenna pattern is appropriate to the mode of satellite orientation discussed above.

In the preceding embodiments it has been assumed that conductive surfaces 15 and 16 of the antenna feed constitute sheets of conductive material. This is the preferred form from an electrical standpoint. However, in some embodiments, depending upon the mechanical and structural design of other parts of the satellite, there is difficulty in preventing undesired buckling of these sheets due to extensive temperature differences that develop in a satellite. In FIGS. 4 and 9 this difficulty is overcome by replacing the conductive surfaces with a large plurality of closely spaced conductive wires 40, each held under tension by small springs 41 located outside of the radio frequency path. For example, as illustrated, springs 41 may be located below plate 26 for surface 16 and above plate 27 for surface 15. In addition to overcoming the tendency of a sheet to buckle, the open nature of wires 40 allows for better heat disposition within the satellite body. Wires 40, however, are subject to power leakage therebetween and special precautions must be taken to prevent resonant modes from being set up in hemispheres 12 and 14.

An alternative form of open surface construction is shown in FIGS. 5 and 8 in which the necessary conductive surfaces are simulated by an "egg-crate" structure comprising a plurality of radial strips 55 intersecting a plurality of circumferential strips 56. Both strips 55 and 56 should have a dimension normal to the plane of the simulated surface of at least a wavelength. The circumferential strips 56 should have a spacing of approximately one quarter wavelength and the radial strips 55 should be spaced to provide at least six per wavelength. Therefore, all radial strips need not extend to center plate 57, but certain ones may be truncated at different circumferential strips as indicated at 58 or 59. Thus, the openings between strips constitute waveguides beyond cut-off and of at least a wavelength deep which effectively eliminates leakages from the radiating space. At the same time, heat distribution within the satellite body is facilitated and the structure has sufficient rigidity to resist buckling.

Figure 6:
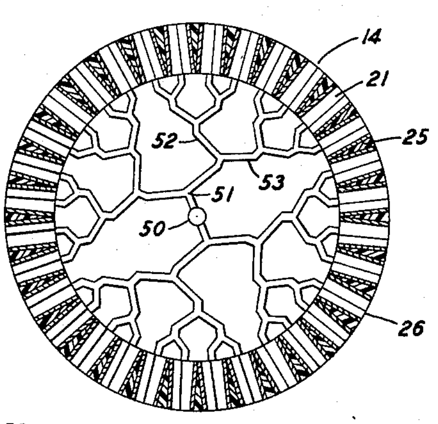
FIG. 6 illustrates an alternative feed which may replace the biconical horn feed of FIG. 1.

It is possible to analyze the preceding embodiments of the invention by considering the biconical horn as a portion of the feed for a circular array of circular polarization producing rectangular waveguide radiators. While such a novel combination of feed and radiator elements has the particular advantages pointed out above, it should be noted that other forms of feed can be used with the radiators. An example of such a combination is shown in FIG. 6. The radiating guides are identical to those described in connection with FIG. 1 and corresponding reference numerals have been used. Power is distributed to radiators 21 by means of a waveguide manifold arrangement which takes the power from primary feed 50 and by means of a plurality of Y type junctions, such as 51, 52 and 53, makes successive power divisions in steps of two. At each dividing junction, the power dividing and impedance transforming sections are given appropriate lengths and dimensions to insure a minimum of reflections, in a manner well known to the art. The objective is to have the path length and loss the same from the common feed 50 to all of the radiators 21. The output and the input to the repeater 19 are combined in waveguide network 20, and connected to the common feed 50 of the manifold in the manner described in connection with FIG. 1.

While junctions 51, 52 and 53 and the connections therebetween have been illustrated as conductively bounded guides of rectangular cross-section, it should be apparent that they may be coaxial type junctions and coaxial connections. Furthermore, it should be apparent that as an alternative to the manifold arrangement described, all feeds, whether coaxial or waveguide, may be fed in parallel from primary feed 50 by the use of suitable impedance matching transformers.

In all cases it is understood that the above described arrangements are merely illustrative of a small number of the many possible applications of the principles of the invention. Numerous and varied other arrangements may be devised by those skilled in the art without departing from the spirit and scope of the invention.

What is claimed is:

1. In a communication system, a biconical antenna, a source of electromagnetic waves having an electric vector perpendicular to the cones of said antenna, means for coupling waves from said source to said antenna, a multiplicity of conductive partitions parallel to said electric vector, and means for converting electromagnetic waves radiated by said antenna to circularly polarized form comprising a multiplicity of ninety degree differential phase shifters disposed around said antenna in the path of said radiated waves.

2. An antenna system comprising a pair of spaced conductive surfaces each having a circumference, means for exciting a wave of electromagnetic wave energy between said surfaces, said wave energy having an electric vector perpendicular to said surfaces, a plurality of conductively bounded waveguides of rectilinear cross-section disposed around said circumference, two walls of each of said waveguides being parallel to said electric vector, and a ninety degree differential phase shifter disposed in each of said guides.

3. An antenna system for a satellite structure having circular symmetry in at least one plane comprising a multiplicity of conductively bounded waveguides of square cross-section disposed about the circumference of said plane with the longitudinal axes of said guides extending radially with an inner end of each extending toward the center of said structure, means for feeding said inner ends of each of said guides with electromagnetic wave energy for radiation from the other end thereof, and a ninety degree differential phase shifter disposed in each of said guides.

4. In an antenna system for high frequency waves, a pair of extended conductive surfaces defining a radiating region in the form of a circumferential slot between said surfaces, means for launching electromagnetic wave energy from a center region between said surfaces, said wave energy having an electric vector perpendicular to said surfaces, a plurality of conductive partitions parallel to said electric vector dividing an outer peripheral portion of said radiating region into a plurality of conductively bounded waveguides disposed around said circumferential slot, and means included in each of said guides for converting wave energy therein into circular polarization.

References Cited by the Examiner

UNITED STATES PATENTS

| | | | |
|---|---|---|---|
| 2,711,533 | 6/55 | Litchford | 343—774 X |
| 2,978,702 | 4/61 | Pakan | 343—773 X |
| 2,981,949 | 4/61 | Elliott | 343—776 |

CHESTER L. JUSTUS, *Primary Examiner.*

GEORGE N. WESTBY, HERMAN K. SAALBACH, *Examiners.*